United States Patent
Van Curen et al.

(10) Patent No.: US 9,578,856 B2
(45) Date of Patent: Feb. 28, 2017

(54) SYSTEM AND METHOD FOR PREVENTING ANIMALS FROM APPROACHING CERTAIN AREAS USING IMAGE RECOGNITION

(71) Applicant: E-Collar Technologies, Inc., Garrett, IN (US)

(72) Inventors: Greg Van Curen, Fremont, IN (US); Hosung So, Seoul (KR)

(73) Assignee: E-Collar Technologies, Inc., Garrett, IN (US)

( * ) Notice: Subject to any disclaimer, the term of this patent is extended or adjusted under 35 U.S.C. 154(b) by 163 days.

(21) Appl. No.: 14/314,180

(22) Filed: Jun. 25, 2014

(65) Prior Publication Data

US 2015/0128878 A1    May 14, 2015

(30) Foreign Application Priority Data

Nov. 12, 2013 (KR) .......................... 10-2013-0137024

(51) Int. Cl.

| | |
|---|---|
| *A01K 15/04* | (2006.01) |
| *A01K 27/00* | (2006.01) |
| *A01K 15/02* | (2006.01) |
| *G06K 9/00* | (2006.01) |
| *G06K 9/62* | (2006.01) |
| *G06K 9/32* | (2006.01) |

(52) U.S. Cl.
CPC ......... *A01K 15/023* (2013.01); *G06K 9/00671* (2013.01); *G06K 9/6201* (2013.01); *G06K 2009/3225* (2013.01)

(58) Field of Classification Search
USPC ...... 119/718–721, 712, 908, 859; 340/573.1, 340/573.3, 573.4, 564
See application file for complete search history.

(56) References Cited

U.S. PATENT DOCUMENTS

| | | | |
|---|---|---|---|
| 5,525,883 A * | 6/1996 | Avitzour | 318/587 |
| 5,870,973 A | 2/1999 | Touchton et al. | |
| 6,415,742 B1 * | 7/2002 | Lee et al. | 119/721 |
| 6,903,682 B1 | 6/2005 | Maddox | |
| 7,046,152 B1 | 5/2006 | Peinetti et al. | |
| 7,184,586 B2 * | 2/2007 | Jeon et al. | 382/153 |
| 7,845,560 B2 * | 12/2010 | Emanuel et al. | 235/462.08 |
| 8,297,233 B2 | 10/2012 | Rich et al. | |
| 8,839,744 B1 * | 9/2014 | Bianchi et al. | 119/720 |
| 8,908,034 B2 * | 12/2014 | Bordonaro | 348/143 |
| 2006/0011145 A1 * | 1/2006 | Kates | 119/719 |

(Continued)

FOREIGN PATENT DOCUMENTS

DE    102004035243    *    2/2006    ............. H04N 17/00

*Primary Examiner* — Andrea Valenti (74) *Attorney, Agent, or Firm* — Taylor IP, P.C.

(57) ABSTRACT

A system and method for preventing an animal being managed by a human from approaching a certain area using image recognition technology includes an apparatus put on the animal, and a marker having either a preset color or a preset shape or both and installed in the certain area. The apparatus put on the animal includes a camera to capture a ground surface image of a movement path of the animal, a stimulus applicator to apply a stimulus to the animal, a memory to store an image of the marker, and a control unit, and operates the stimulus applicator to apply a stimulus to the animal when an image matched with the image of the marker stored in the memory is recognized in the image captured by the camera as the animal moves.

24 Claims, 6 Drawing Sheets (56) References Cited

U.S. PATENT DOCUMENTS

| | | | |
|---|---|---|---|
| 2006/0177101 A1* | 8/2006 | Kato et al. | 382/106 |
| 2011/0061605 A1* | 3/2011 | Hardi et al. | 119/721 |
| 2012/0204811 A1* | 8/2012 | Ryan | 119/720 |
| 2013/0157628 A1* | 6/2013 | Kim et al. | 455/414.1 |
| 2014/0020635 A1* | 1/2014 | Sayers et al. | 119/721 |
| 2014/0320347 A1* | 10/2014 | Rochelle et al. | 342/385 |

* cited by examiner

SYSTEM AND METHOD FOR PREVENTING ANIMALS FROM APPROACHING CERTAIN AREAS USING IMAGE RECOGNITION

CROSS REFERENCE

The present application claims priority to Korean Patent Application No. 10-2013-0137024 filed in the Republic of Korea on Nov. 12, 2013, the disclosures of which are incorporated herein by reference.

BACKGROUND OF THE INVENTION

The present disclosure relates to a system and method for controlling animals, and more particularly, to a system and method for preventing animals, for example, pet animals such as dogs, cats, or livestock, from approaching or escaping a certain area.

In agriculture, fences are used to keep animals, in particular wild animals out of an area. Electric fencing having a high voltage electric current flowing within is also sometimes used to keep such wild animals out. However, this electric fence used to keep wild animals out, has a drawback of unintentionally providing an electric shock to others, such as people, livestock, or pet animals.

Meanwhile, Patent Literature 1 (Publication of U.S. Pat. No. 5,870,973) discloses a system in which a high frequency receiver capable of applying a stimulus such as an electric shock is put around a neck of a pet dog, a wire (a transmitter antenna, a fence) is laid underground along a perimeter of a certain area the pet dog is prohibited from escaping or approaching, a transmitter transmits a high frequency signal through the wire, and when the pet dog approaches the wire, the high frequency receiver worn around the neck of the pet dog detects the high frequency signal and a stimulus is applied to the neck of the pet dog to keep the pet dog from approaching the wire (fence).

Also, Patent Literature 2 (Publication of U.S. Pat. No. 7,046,152) teaches a system in which a low power transmitter is installed in a certain zone (area), and when a pet dog approaches the transmitter, a receiver fastened around a neck of the pet dog senses a high frequency signal from the transmitter and a stimulus is applied to a pet dog like Patent Literature 1.

Also, Patent Literature 3 (Publication of U.S. Pat. No. 8,297,233) is basically similar to Patent Literature 2, and describes a wireless fence system, in which a single base unit having a sufficiently large control range (certain area) with a radius of ten or more meters is installed, and when a sensitivity of a high frequency signal being received in a receiver fastened around a neck of a pet dog from the base unit drops down to a predetermined value or less, a stimulus is applied to the pet dog like Patent Literature 1.

Also, Patent Literature 4 (Publication of U.S. Pat. No. 6,903,682) provides a system in which a receiver having a stimulus applying function and a GPS receiving function as well as a memory is worn around a neck of a pet dog, a perimeter of a certain area is stored (set) in the memory, a current location of the pet dog is detected based on a GPS signal being received by the receiver from a satellite, and when the pet dog comes close to the set perimeter of the certain area, a stimulus is applied to the pet dog like Patent Literature 1.

However, the systems of Patent Literatures 1 through 4 have the following drawbacks.

First, in the case of the system of Patent Literature 1, there is a disadvantage of having to bury the wire (transmitter antenna) along the perimeter of a certain area. Also, having to move an already installed wire (fence) to another location is difficult, and it is impossible for an ordinary person (an owner of a pet dog) to find and repair an unexpectedly disconnected wire. Also, in the case of the system of Patent Literature 3, the perimeter of a certain area can only be set in a shape of a circle having a predetermined radius from the base unit and when an obstruction such as a building exists within the perimeter, there may be a difference between a desired perimeter and an actually implemented perimeter. Also, in the case of the system of Patent Literature 4, it is not designed for indoor use and the signal received from the satellite may be influenced by weather conditions.

Above all, in addition to the difficulties inherent to the respective systems, the systems disclosed in Patent Literatures 1 through 4 have common problems in that a transmitter or a receiver requires costly electronic components and it is impossible for an ordinary person to maintain and repair the systems because they are based on a communication technology for transmission and reception of a high frequency signal. Also, since the systems disclosed in Patent Literatures 1 through 4 commonly need a transmitter (or a base unit or a satellite), it costs a great deal to construct an entire system and it is impossible for an ordinary person to maintain and repair a transmitter. Further, since power needs to be supplied to a transmitter, there exists a limitation on an installation location of the transmitter, and if a battery is used to supply power to the transmitter, there is an inconvenience in having to replace the battery at a proper time. In the case of the system of Patent Literature 4 using a GPS, although a user does not have to pay attention to a satellite corresponding to a transmitter, initial system setup such as setting at least a perimeter of a certain area is required and when time for initial setup or settings change, a device other than a receiver, such as a computer, is necessary.

RELATED ART CITATION

Patent Literature

Patent Literature 1: Publication of U.S. Pat. No. 5,870,973
Patent Literature 2: Publication of U.S. Pat. No. 7,046,152
Patent Literature 3: Publication of U.S. Pat. No. 8,297,233
Patent Literature 4: Publication of U.S. Pat. No. 6,903,682

SUMMARY OF THE DISCLOSURE

The present disclosure is designed to solve the problems of the related art, and therefore the present disclosure is directed to providing a system and method for preventing animals from approaching a certain area that eliminates the need for a separate transmitter or a device for initial setup and consequently eliminates the need for maintenance and repair thereof, can freely set a certain area and its perimeter regardless of being indoors or outdoors, and allows an ordinary person to readily install and use at a low cost without a costly high frequency communication component and the like.

To achieve the above object, the present disclosure provides a system and method for preventing animals being managed by humans such as pet animals or livestock from approaching an area the animals are prohibited from approaching, using an image recognition technology rather than a high frequency communication technology.

That is, the system for preventing animals from approaching according to one aspect of the present disclosure is a system configured to prevent an animal being managed by a human from approaching an area the animal is prohibited from approaching, and includes an apparatus put on the animal, and a marker having either a preset color or a preset shape or both and installed in the area the animal is prohibited from approaching, and the apparatus put on the animal includes a camera to capture ground surface images of a movement path of the animal, a stimulus applying means to apply a stimulus to the animal, a memory to store an image of the marker, and a control unit to control the stimulus applying means which operates to apply a stimulus to the animal when an image matched with the image of the marker stored in the memory is recognized in the image captured by the camera.

Also, the method of preventing animals from approaching according to another aspect of the present disclosure is a method configured to prevent an animal being managed by a human from approaching an area the animal is prohibited from approaching, and includes installing a marker having either a preset color or a preset shape or both in the area, putting, on the animal, an apparatus comprising a camera to capture a ground surface image, a stimulus applying means to apply a stimulus to the animal, a memory to store an image of the marker, and a control unit to control the camera, the stimulus applying means, and the memory, capturing a ground surface image of a movement path of the animal using the camera as the animal moves, recognizing, by the control unit, an image matched with the image of the marker stored in the memory among the image captured by the camera, and applying a stimulus to the animal by the stimulus applying means when the image matched with the image of the marker is recognized in the image captured by the camera.

Also, in the system and method according to the present disclosure, the marker may include at least two types distinguishable in either the preset color or the preset shape or both, and at least two marker images corresponding to the at least two types of markers may be stored in the memory.

In this case, the stimulus applying means may apply at least two different types of stimuli to the animal or adjust a strength of the stimulus, and when the image matched with the image of the marker stored in the memory is recognized in the image captured by the camera, the control unit may control the stimulus applying means to apply different types of stimuli or stimuli of different strengths to the animal based on a type of the recognized marker.

Meanwhile, the stimulus applied to the animal includes at least one of a sound, a vibration, and an electric shock stimulus.

Also, the marker may be coated with a fluorescent material, a phosphorescent material, or a light reflective material on at least the surface thereof.

Alternatively, the marker may include a light emitting element that emits light in a predetermined color or shape. In this case, preferably, the marker further includes a light intensity sensor to sense an amount of ambient light, and enables the light emitting element to operate when an amount of light sensed by the light intensity sensor is less than or equal to a predetermined value.

Also, in the system and method according to the present disclosure, the apparatus put on the animal may further include a light intensity sensor to sense an amount of ambient light, and a lighting means to illuminate the ground surface captured by the camera, and the control unit may illuminate the ground surface using the lighting means when an amount of light sensed by the light intensity sensor is less than or equal to a predetermined value.

In this case, the apparatus put on the animal may further include a motion sensor to sense a motion of the animal, and the control unit may illuminate the ground surface using the lighting means when an amount of light sensed by the light intensity sensor is less than or equal to a predetermined value and a motion of the animal is sensed by the motion sensor.

Also, in the system and method according to the present disclosure, the apparatus put on the animal may further include a motion sensor to sense a motion of the animal, and the control unit may operate the camera and the stimulus applying means only when a motion of the animal is sensed by the motion sensor.

Also, in the system and method according to the present disclosure, a strength of the stimulus applied to the animal by the stimulus applying means is adjustable, and the control unit may store an operation time of the stimulus applying means in the memory each time the stimulus applying means operates, and control the stimulus applying means to adjust the strength of the stimulus based on the operation time of the stimulus applying means stored in the memory.

The system and method for preventing animals from approaching according to the present disclosure does not use communication equipment such as a transmitter that transmits a high frequency signal, a satellite, and the like, and simply uses a marker of which an image is captured by a camera passively.

Accordingly, the system can be built at a low cost without the need for a costly high frequency communication equipment. Also, construction and initial setup of the system may be completed only by installing a marker at a desired zone (area), and maintenance and repair of the system may be completed by replacing a damaged marker or changing a location of the marker so that even an ordinary person may readily construct, change, and maintain and repair the system. Also, because a zone, area, or its perimeter an animal is prohibited from escaping or approaching is set using a marker, a desired zone, area, or perimeter may be freely set regardless of being indoors or outdoors.

The above-mentioned and other features and advantages of the present disclosure will be better understood by the following detailed description.

DESCRIPTION OF THE PREFERRED EMBODIMENTS

Hereinafter, a system and method for preventing animals from approaching according to preferred embodiments of the present disclosure will be described in detail with reference to the accompanying drawings.

Meanwhile, the following description provides a typical pet dog as an example of an animal that is discouraged from approaching a certain zone or area according to the present disclosure, however the present disclosure can be applied to any animal if such animal is being managed by humans, for example, various pet animals, livestock, as well as pet dogs.

Also, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
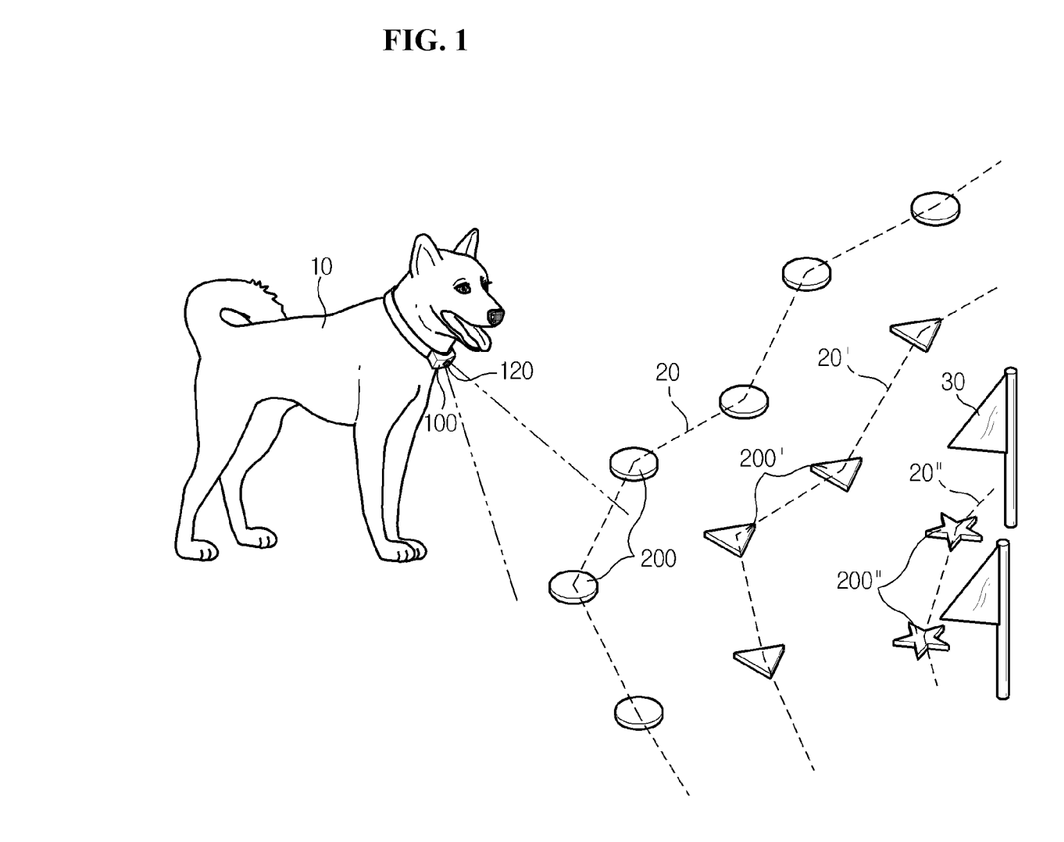
FIG. 1 is a schematic perspective view illustrating a constructed state of a system according to an exemplary embodiment.

FIG. 1 is a schematic perspective view illustrating a constructed state of a system according to an exemplary embodiment. A system for preventing animals being managed by humans from approaching an area not permitted to approach according to the present disclosure, hereinafter referred to as a system, includes an apparatus 100 put on a body (preferably, a neck) of an animal 10, hereinafter referred to as an apparatus, and a marker 200 installed in a zone or area the animal is prohibited from approaching.

That is, the system of the present disclosure is built by installing the markers 200, 200', and 200" along a perimeter 20 of the area the animal 10 is prohibited from escaping, for example, a garden, or in the vicinity of a front door of a house the animal is prohibited from leaving or in a room the animal is prohibited from approaching, and by putting the apparatus 100 on a neck of the animal 10. The apparatus 100 is provided with a camera 120 and a means for applying a stimulus such as an electric shock stimulus, and thus, when images of the markers 200, 200', and 200" are recognized in an image captured by the camera 120 as the animal 10 moves, the stimulus applying means applies a stimulus to the animal 10 to prevent the animal 10 from approaching the certain area 20. It should be appreciated that the "stimulus applying means" referenced herein can also be referred to as a "stimulus applicator."

Meanwhile, although FIG. 1 shows an example of markers 200, 200', and 200" having three different shapes and installed along three certain areas 20, 20', and 20" having different ranges, respectively, the number of types of the markers 200, 200', and 200" is not limited to the illustrated example and only one marker type may be used. Also, although FIG. 1 shows that a marker type is classified based on shapes; however, different types of markers may be implemented by using an identical shape but different colors (for example, yellow, orange, red, and the like) or using different shapes and different colors. Further, although FIG. 1 shows a plurality of markers 200, 200', and 200", only one marker may be installed in a certain zone.

When at least two markers 200, 200', and 200" are used, different types of stimuli (for example, a sound, a vibration, and an electric shock) or stimuli of different strengths (for example, the closer to the final prohibited area 20", the stronger stimulus) may be applied based on an extent to which the animal 10 escapes or approaches the certain area.

Meanwhile, in FIG. 1, a reference numeral 30, separate from the markers 200, 200', and 200", indicates a flag that is used to improve a learning effect in the animal 10 and is useful at the beginning stages of system construction or change. That is, in case the flag 30 visually discernable to the animal 10 is installed in the area the animal is prohibited from approaching together with the markers 200, 200', and 200", when the animal 10 approaches the markers 200, 200', and 200", the flag 30 is discerned by the vision of the animal 10 and at the same time, an operation of applying a stimulus is repeatedly performed by the system of the present disclosure, so that the animal 10 naturally learns not to approach the areas 20, 20', and 20". The flag 30 is an optional means, and may be omitted when a sufficient learning effect can be expected only by the markers 200, 200', and 200". However, for example, dissimilar to FIG. 1, in case a marker type is classified based on colors, a color blind dog cannot discern the markers 200, 200', and 200" or identify a marker type. Accordingly, in this case, the flag 30 is useful. Also, although FIG. 1 shows the flag 30 as an example of a learning effect improvement means, the present disclosure is not limited to a flag, and any recognizable indicator may be contemplated.

Hereinafter, a detailed description of each element of the system of the present disclosure, that is, the apparatus 100 and the marker 200, is provided.

Figure 2:
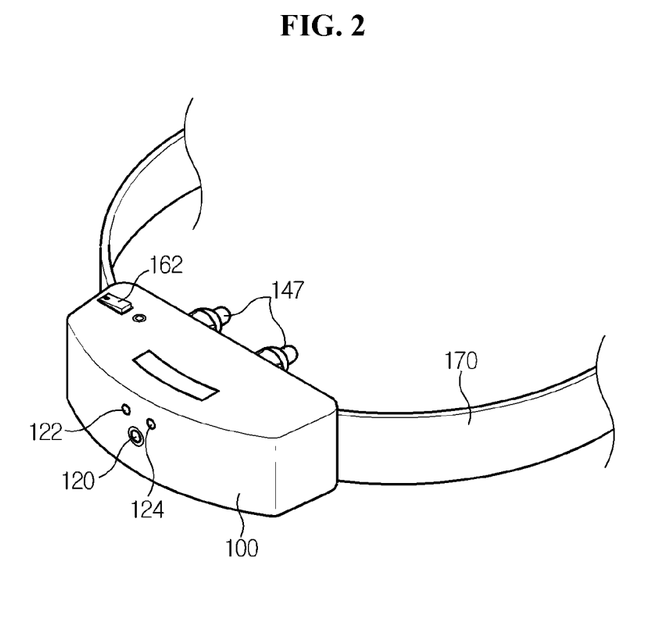
FIG. 2 is a schematic perspective view illustrating an apparatus put on an animal according to an exemplary embodiment.
Figure 3:
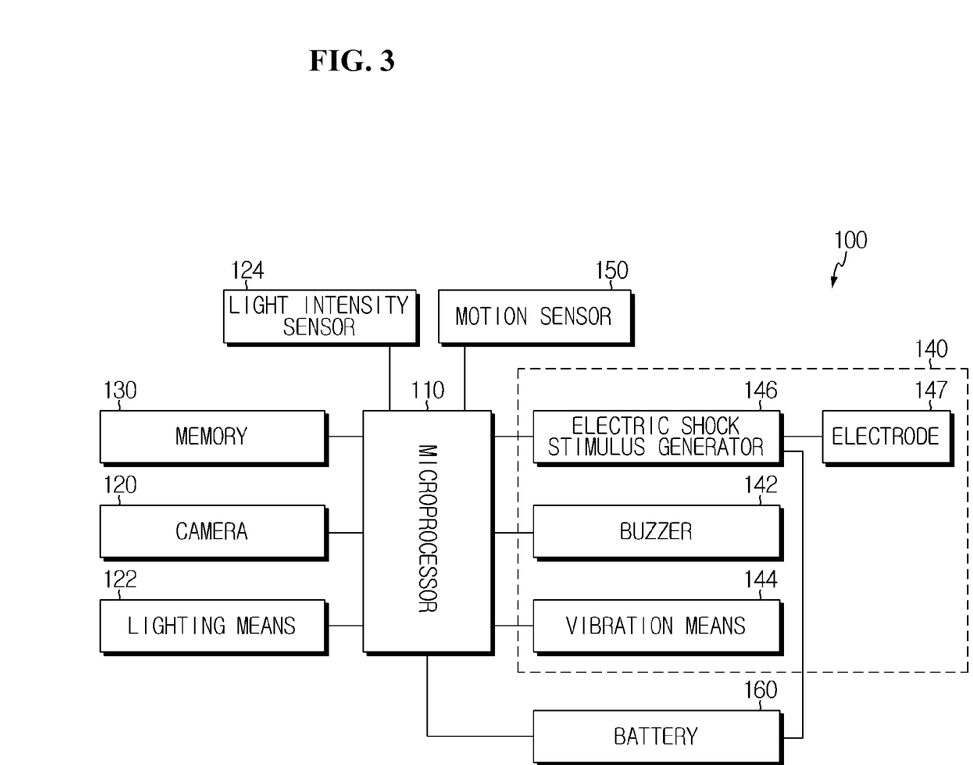
FIG. 3 is a block diagram illustrating a configuration of an apparatus put on an animal according to an exemplary embodiment.

The apparatus 100 includes the camera 120, a memory 130, a stimulus applying means 140, a control unit (microprocessor) 110 as shown in FIGS. 2 and 3.

The camera 120 is embedded and installed in the apparatus 100 such that the camera 120 faces toward the ground surface when the apparatus 100 is worn around the neck of the animal 10. Accordingly, as the animal 10 moves, the camera 120 captures a ground surface image of a movement path of the animal 10. The camera 120 may be implemented as, for example, a charge-coupled device (CCD), and may use a visible ray camera that senses light of a visible ray wavelength band and captures an image, or an infrared camera that senses light of an infrared ray band and captures an image. Also, with the development of digital camera technologies, there is a commercial camera having a resolution that is sufficient enough for image recognition and a size small enough to be embedded in the apparatus 100 that is of several centimeters in width, length, and height, and accordingly, such a product may be used. Further, although a detailed description will be provided below, since the image captured by the camera 120 is not for artistic reasons, a costly high-performance camera is not required, and any camera having a resolution and a number of frame sufficient enough to identify and recognize a marker image may be contemplated.

Meanwhile, particularly, when a visible ray camera is used as the camera 120, the image of the ground surface may be too dark to identify and recognize the images of the markers 200, 200', and 200" at night or in a dark room. To solve the problem, the apparatus 100 of this embodiment may further include a lighting means 122. The lighting means 122 is not limited to a specific type if it can properly illuminate the ground surface within an imaging range, and may typically use a light emitting diode (LED) lamp.

Also, the apparatus 100 may further include a light intensity sensor 124 to sense an amount of ambient light, and it is preferred to operate the lighting means 122 only when the surroundings are dark (the amount of ambient light sensed by the light intensity sensor 124 is less than or equal to a predetermined value). The light intensity sensor 124 may use a conventional light receiving element. Alternatively, the camera 120 may also serve as a light intensity sensor without a separate light intensity sensor in such a way that the control unit 110 recognizes brightness of the image captured by the camera 120.

Also, when the markers 200, 200', and 200" does not have a specific shape but a specific color, the camera 120 may include a filter that allows only light of a wavelength band of the particular color to pass through.

The memory 130 stores various data, for example, the images of the markers 200, 200', and 200" that will be identified and recognized in the image captured by the camera 120, a program executed by the control unit 110, and the like. A detailed description of the data stored in the memory 130, for example, the images of the markers 200, 200', and 200", the program, and the like, will be provided below.

The stimulus applying means 140 is a means for applying a proper stimulus to the animal 10 when the animal 10 approaches the area the animal is prohibited from approaching, and is not limited to a specific type if it can transmit a warning message to an animal, and may typically use any one or at least two of a sound, a vibration, an electric shock stimulus, and an odor that an animal dislikes. In this embodiment, the stimulus applying means 140 includes buzzers 142 of various types for applying a sound stimulus, a vibration means 144 for applying a vibration stimulus including a piezoelectric element or a vibration motor, an electric shock stimulus generator 146 for generating an electrical pulse of low power and high voltage (for example, 50 VAC to 10,000 VAC), and an electrode 147 for applying the generated electrical pulse to the neck of the animal 10. The electric shock stimulus generator 146 typically includes a transformer to transform a low voltage power supplied from a battery 160 into a high voltage pulse.

When a stimulus type is provided plurally as described in the foregoing, the markers 200, 200', and 200" of different types are recognized based on an extent to which the animal 10 approaches the prohibited area, and thereby different types of stimuli may be applied to the animal 10. For example, when the animal approaches the area 20 farthest away from the final prohibited area 20" (when the image of the marker 200 is recognized in the image captured by the camera), a relatively weak sound stimulus may be applied by operating the buzzer 142, when the animal approaches the next prohibited area 20' (when the image of the marker 200' is recognized), a stronger vibration stimulus may be applied by operating the vibration means 144, and when the animal approaches the final prohibited area 20" (when the image of the marker 200" is recognized), a strongest electric shock stimulus may be applied by operating the electric shock stimulus generator 146.

Meanwhile, independent of having the stimulus applying means 140 of multiple types or single type, a strength of the stimulus applied by the respective stimulus applying means 140 may be preferably adjusted by the control unit 110. By doing so, particularly, when the stimulus applying means 140 of single type is provided, stimuli of different strengths may be applied based on an extent to which the animal approaches the prohibited areas 20, 20', and 20", as described in the foregoing. Also, the strength of the stimulus applied may be adjusted based on how frequently the animal 10 approaches the prohibited areas 20, 20', and 20", a detailed description will be provided below though, and accordingly, as the animal 10 approaches the prohibited areas 20, 20', and 20" more frequently, a stronger stimulus may be applied.

The adjustment of the strength of the stimulus applied may be different based on a type of the stimulus applying means 140, however the adjustment may be enabled typically by increasing or decreasing a period of time during which the stimulus is applied, in a case of a sound stimulus (buzzer), by adjusting an intensity or a frequency of a warning sound, in a case of a vibration stimulus (vibration means), by adjusting an intensity or a frequency of a vibration, or in a case of an electric shock stimulus, by adjusting an amplitude (voltage), a pulse width, or a duty ratio of an electrical pulse.

Also, preferably, the apparatus 100 may include a motion sensor 150. The motion sensor 150 may be typically implemented as an acceleration sensor, but is not limited thereto. Accordingly, when the motion sensor 150 is provided, the system may be operated only when the animal 10 makes a movement, thereby reducing consumption of the battery 160 to a minimum.

Also, the apparatus 100 includes the battery 160 to provide power to each component that consumes power of the apparatus 100. Preferably, the battery 160 uses a rechargeable secondary battery. Further, the apparatus 100 may include a display (not shown) to show a remaining amount of the battery 160 to enable a user to replace or charge the battery 160 at a proper time.

Also, the apparatus 100 may include a switch 162 to set the power on/off from the battery 160 or operate/stop the system, and further, the apparatus 100 may also include a user interface (not shown) for setting the system (for example, setting of a type or an initial strength of a stimulus applied).

The control unit 110 is an element that controls the operation of each component of the apparatus 100, and is typically implemented as a microprocessor. The control unit 110 functions mainly to extract and recognize, from the image captured by the camera 120, an image matched with the image of the marker stored in the memory 130, and when the image of the marker is recognized in the image captured by the camera 120, the stimulus applying means 140 operate to apply a stimulus to the animal 10. A more specific operation of the control unit 110 will be described below.

The markers 200, 200', and 200" that make up the system together with the apparatus 100 are installed in the areas 20, 20', and 20" the animal 10 is prohibited from approaching. The markers 200, 200', and 200" may have either a particular shape or a particular color or both as described in the foregoing, and are not limited to the type illustrated in the drawing, and there is no special limitation on the shape or color if they are recognizable and are easy to install and distinguishable from a surrounding object to fit the image recognition.

Figure 4:
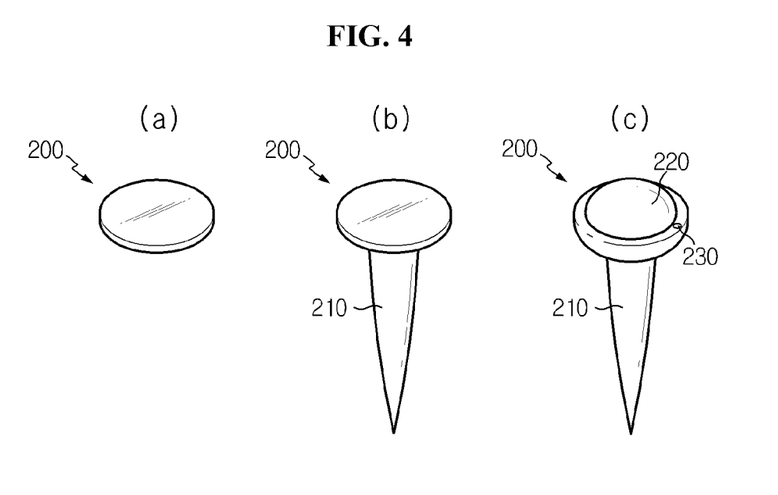
FIG. 4 is a view illustrating examples of markers used in a system according to an exemplary embodiment.

In FIG. 4, examples of the marker used in the present disclosure are illustrated, and the marker 200 shown in (a) of FIG. 4 can be installed indoors or in the hard ground surface and is flat having either a particular shape or a particular color or both. Preferably, the marker 200 has an adhesive applied to the bottom such that the marker 200 is installed by adhering onto the ground surface. The markers shown in (b) and (c) of FIG. 4 can be installed in the soft ground such as an outdoor garden and the like, and the marker 200 having a stake-shaped leg 210 on the bottom is installed by driving the leg 210 into the ground.

Meanwhile, particularly, when a visible ray camera is used as the camera 120, it may be difficult to identify and recognize the image of the marker in the image captured by the camera 120 at night or in a dark room. To solve the problem, at least the surface of the marker 200 may be formed from a fluorescent material, a phosphorescent material, or a light reflective material, or the marker 200 may be coated with a fluorescent material, a phosphorescent material, or a light reflective material on the surface thereof. Alternatively, as shown in (c) of FIG. 4, the marker 200 may include a light emitting element 220 that emits light in a predetermined color or shape. Also, in this case, the marker 200 may further include a light intensity sensor 230 to sense an amount of ambient light, and may enable the light emitting element 220 to operate only when the amount of light sensed by the light intensity sensor 230 is less than or equal to a predetermined value.

Figure 5:
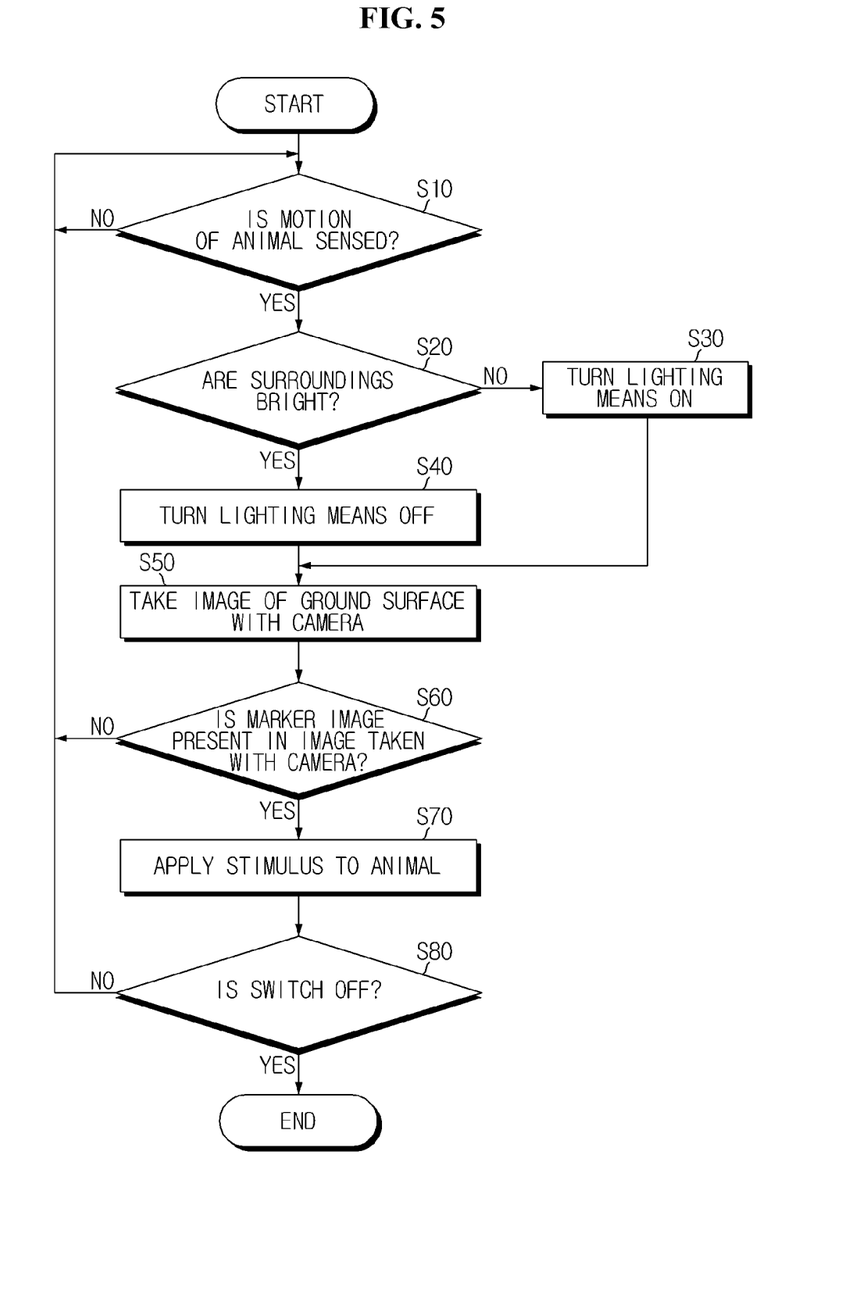
FIG. 5 is a flowchart illustrating a method according to an exemplary embodiment.

Hereinafter, preferred embodiments of a method of preventing animals from approaching a certain area using the system according to the embodiment of the present disclosure as described in the foregoing will be described with reference to FIGS. 5 through 7.

First, the system according to the exemplary embodiment of the present disclosure is constructed. The construction of the system is completed by installing the foregoing markers 200, 200', and 200" in the areas 20, 20', and 20" the animal is prohibited from approaching and by putting the foregoing apparatus 100 on a body (preferably, a neck) of the animal 10. In this instance, initial setup of the apparatus 100, for example, a type or an initial strength of a stimulus applied may be optionally set according to necessity.

After the construction of the system is completed as described in the foregoing, the system is operated by turning on a power switch or an operation switch 162. When the system operates, as the animal 10 moves, a ground surface image of a movement path of the animal 10 is captured using the camera 120, and when an image matched with the image of the marker stored in the memory 130 is recognized in the image captured by the camera 120, a stimulus is applied to the animal 10 by the stimulus applying means 140.

More specifically, first, the control unit 110 senses a motion of the animal 10 using the motion sensor 150 (S10). As a result, when the motion of the animal is sensed, the control unit 110 determines whether surroundings are sufficiently bright using the light intensity sensor 124 (S20). As a result, when the surroundings are sufficiently bright (an amount of light higher than a predetermined value is sensed), the lighting means 122 is turned off, and when the surroundings are dark (an amount of light lower than or equal to a predetermined value is sensed), the lighting means 122 is turned on. Accordingly, an image of the ground surface may be properly captured while reducing consumption of the battery 160 to a minimum, by operating the system only when the motion of the animal is sensed using the motion sensor 150 and by turning on the lighting means 122 only when the surroundings are dark using the light intensity sensor 124.

Subsequently, an image of the ground surface on a movement path of the animal 10 is captured by the camera 120 (S50). Here, the image captured by the camera 120 is not for artistic reasons, and thus a high resolution moving image is not necessary and a still image allowing identification and recognition of a marker image is sufficient enough. However, when a movement speed of the animal 10 and a viewing angle of the camera 120 are taken into consideration, an image having several frames per second (corresponding to a continuous shooting speed of a digital still camera) is preferred even though it is not a moving image having twenty frames per second or more. Further, a speed sensor may be provided as the foregoing motion sensor 150 so that the configuration may be implemented to increase a frame per second in proportion to a speed calculated by the speed sensor.

Subsequently, the control unit 110 identifies and recognizes the image of the marker 200 in the image captured by the camera 120 (S60). A process of recognizing the marker image may be implemented in software using well-known image recognition technology, and a detailed description is provided with reference to FIG. 6.

Figure 6:
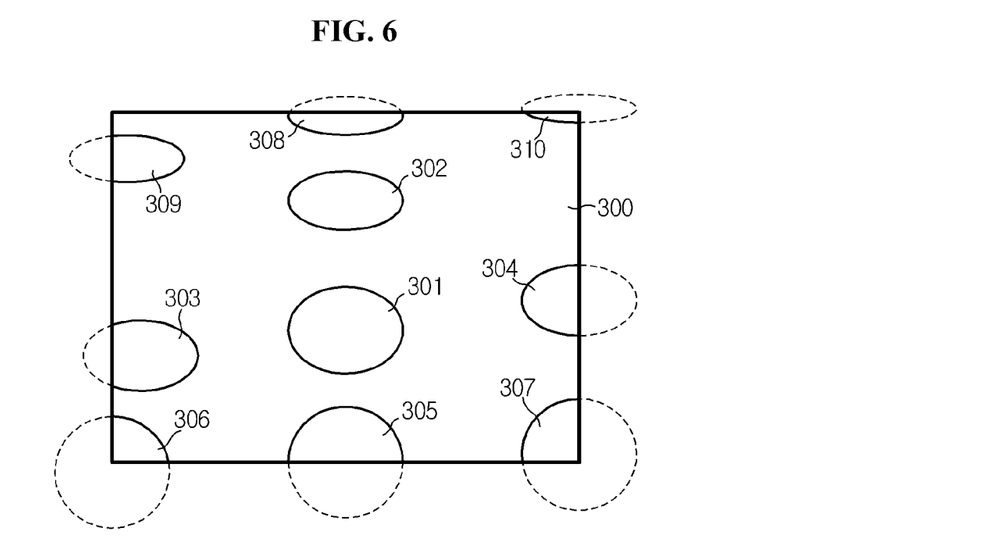
FIG. 6 is a schematic view illustrating a process of recognizing a marker image according to an exemplary embodiment.

In FIG. 6, a reference numeral 300 represents an image (still image) corresponding to one frame in the image captured by the camera 120, and the control unit 110 receives this image 300 from the camera 120 in real time and identifies and recognizes marker images 301~310 in the image 300. Although FIG. 6 shows a plurality of marker images 301~310 in one image 300, one marker image or two or three marker images may be present in one image 300 based on an installation density of the marker 200 and an angle of view of the camera 120.

Also, when a shape of the marker 200 is assumed to be a circular shape, the marker images 301~310 in the image 300 may change in size and circularity based on a distance from the camera 120 and a viewing angle of the camera 120. Also, the marker images 301~310 may be captured along the perimeter of the image 300, and in this case, the marker images may exist in a shape of a truncated circle or oval, for example, 303~310, rather than a full circle or oval, for example, 301 and 302.

Accordingly, it is preferred to pre-store, as a reference marker image, circles and ovals having a variety of circularities that can be present in one image 300 by an experiment, in the memory 130. Then, the control unit extracts a circle or oval in the image 300 captured by the camera 120 or a piece of a circle or oval on the perimeter of the image, enlarges or reduces the extracted circle or oval or its piece according to necessity, recognizes the marker image by comparing to the reference marker image stored in the memory 130, and determines that the animal 10 approaches the marker 200. In this instance, in case the marker image extracted from the image 300 corresponds to a piece of a circle or oval, for example, 303~310, the marker image may be recognized when a contour concordance rate is more than or equal to a predetermined value (for example, 50% or more), for example, 303, 304, 305, 308, and 309.

Meanwhile, although FIG. 6 describes a process of recognizing the marker image taking the marker 200 having a circular shape for an instance, it is obvious that marker image recognition may be performed by the same method when the marker has other shapes such as a triangle or a square.

Also, when the marker 200 has a particular color rather than a particular shape, an area ratio of the particular color occupying the image 300 may be calculated, and when the area ratio corresponds to a predetermined value (for example, 5%-20%), the marker image may be recognized. In this case, as described in the foregoing, use of a filter provided in the camera 120, through which only a wavelength band corresponding to the particular color passes, may allow efficient recognition of the marker image of the particular color.

When the marker image is recognized in S60, the control unit 110 applies a stimulus to the animal 10 using the stimulus applying means 140 to let the animal know that the animal approaches the prohibited areas 20, 20', and 20" (S70).

In this instance, as shown in FIG. 1, when at least two types of the markers 200, 200', and 200" are used and at least two types of stimulus applying means are used or a stimulus strength of the stimulus applying means can be adjusted, a learning effect of the animal 10 may be improved by changing a type or a strength of stimulus applied based on the recognized marker type.

Also, in S70, the strength of stimulus applied may be adjusted by referring to a history of the animal 10 having previously approached the prohibited areas 20, 20', and 20". That is, the control unit 110 may store an operation time of the stimulus applying means 140 in the memory 130 each time the stimulus applying means 140 operates, and may adjust the strength of stimulus based on the operation time of the stimulus applying means stored in the memory, for example, increasing the strength of stimulus as the stimulus applying means operates more frequently or as a time elapsed from a point in time at which the stimulus applying means has previously operated is shorter.

Figure 7:
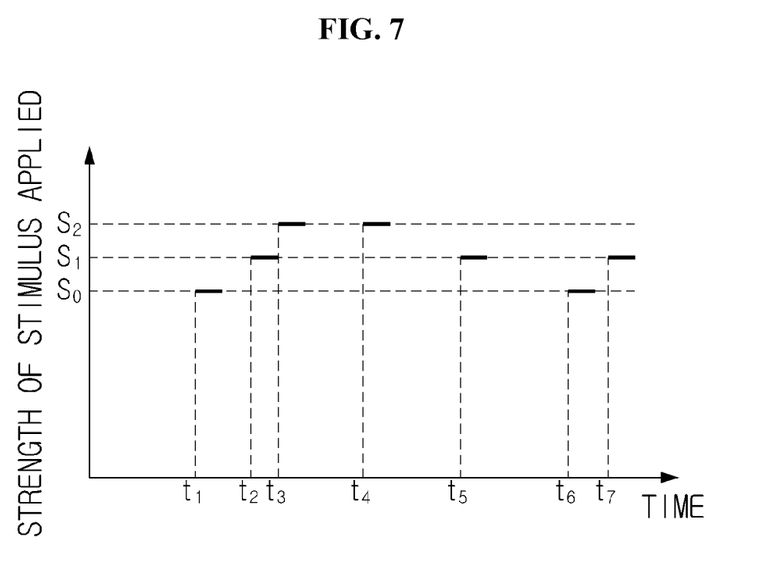
FIG. 7 is a graph illustrating a process of adjusting a stimulus strength according to an exemplary embodiment.

Specifically, as seen in the graph of FIG. 7, when the animal approaches the prohibited area again ($t_2$, $t_3$, and $t_7$) within a predetermined short period of time from a point in time at which a previous stimulus is applied (the animal approaches the prohibited area), a stronger stimulus than a strength (each $t_1$, $t_2$, and $t_6$) of the previous stimulus may be applied, and when there is no approach to the prohibited area for a longer time than the predetermined short period of time, the stimulus strength may be reduced to the same level as the previous stimulus strength (in a case of $t_4$), and when there is no approach to the prohibited area for a predetermined time longer than this period of time again, the stimulus strength may be reduced to a level less than the previous stimulus strength or to an initial stimulus strength $s_0$ (in a case of $t_5$ and $t_6$).

Subsequently, finally, determination as to whether the system power switch or operation switch 162 is OFF may be made (S80), and when it is determined to be OFF, the operation of the system may be stopped, and when it is determined to be still ON, the method reverts to S10 and repeats the above process.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A system for preventing animals from approaching that prevents an animal being managed by a human from approaching an area the animal is prohibited from approaching, the system comprising:
   an apparatus put on the animal;
   a marker having either a preset color or a preset shape or both and installed in the area the animal is prohibited from approaching; and
   a second marker having at least one of a second preset color and a second preset shape and installed in the area the animal is prohibited from approaching, at least one of the second preset color being different than the preset color of the marker and the second preset shape being different than the preset shape of the marker,
   the apparatus put on the animal comprising:
      a camera to capture a ground surface image of a movement path of the animal;
      a stimulus applicator to apply a stimulus to the animal;
      a memory to store an image of the marker and a second image of the second marker; and
      a control unit configured to control the stimulus applicator which operates to apply a first stimulus to the animal when an image matched with the image of the marker stored in the memory is recognized in the image captured by the camera and apply a second stimulus to the animal when an image matched with the second image of the second marker stored in the memory is recognized in the image captured by the camera, the second stimulus being different than the first stimulus, wherein said control unit is configured to cause said stimulus applicator to apply at least one of said first stimulus and said second stimulus without receiving a signal from a unit which is separate from said apparatus.

2. The system according to claim 1, wherein the preset shape of the marker is different than the second preset shape of the second marker.

3. The system according to claim 2, wherein the stimulus applicator is capable of applying at least two different types of stimuli to the animal, and when the image matched with the image of the marker stored in the memory is recognized in the image captured by the camera, the control unit controls the stimulus applicator to apply different types of stimuli to the animal based on a type of the recognized marker.

4. The system according to claim 2, wherein a strength of the stimulus applied to the animal by the stimulus applicator is adjustable, and when the image matched with the image of the marker stored in the memory is recognized in the image captured by the camera, the control unit controls the stimulus applicator to apply stimuli of different strengths to the animal based on a type of the recognized marker.

5. The system according to claim 1, wherein the stimulus applied to the animal includes at least one of a sound, a vibration, and an electric shock stimulus.

6. The system according to claim 1, wherein the marker is coated with a fluorescent material, a phosphorescent material, or a light reflective material on at least the surface thereof.

7. The system according to claim 1, wherein the marker includes a light emitting element that emits light in a predetermined color or shape.

8. The system according to claim 7, wherein the marker further includes a light intensity sensor to sense an amount of ambient light, and enables the light emitting element to operate when an amount of light sensed by the light intensity sensor is less than or equal to a predetermined value.

9. The system according to claim 1, wherein the apparatus put on the animal further includes a light intensity sensor to sense an amount of ambient light, and a lighting device to illuminate the ground surface captured by the camera, and the control unit illuminates the ground surface using the lighting device when an amount of light sensed by the light intensity sensor is less than or equal to a predetermined value.

10. The system according to claim 9, wherein the apparatus put on the animal further includes a motion sensor to sense a motion of the animal, and the control unit illuminates the ground surface using the lighting device when an amount of light sensed by the light intensity sensor is less than or equal to a predetermined value and a motion of the animal is sensed by the motion sensor.

11. The system according to claim 1, wherein the apparatus put on the animal further includes a motion sensor to sense a motion of the animal, and the control unit operates the camera and the stimulus applicator only when a motion of the animal is sensed by the motion sensor.

12. The system according to claim 1, wherein a strength of the stimulus applied to the animal by the stimulus applicator is adjustable, and the control unit stores an operation time of the stimulus applicator in the memory each time the stimulus applicator operates, and controls the stimulus applicator to adjust the strength of the stimulus based on the operation time of the stimulus applicator stored in the memory.

13. A method of preventing animals from approaching that prevents an animal being managed by a human from approaching an area the animal is prohibited from approaching, the method comprising:

installing a marker having either a preset color or a preset shape or both in the area;

installing a second marker having at least one of a second present color and a second preset shape in the area, at least one of the second present color being different than the preset color of the marker and the second preset shape being different than the preset shape of the marker;

putting, on the animal, an apparatus comprising a camera to capture a ground surface image, a stimulus applicator to apply a stimulus to the animal, a memory to store an image of the marker and a second image of the second marker, and a control unit to control the camera, the stimulus applicator, and the memory;

capturing a ground surface image of a movement path of the animal using the camera as the animal moves;

recognizing, by the control unit, an image matched with the image of the marker stored in the memory among the image captured by the camera or an image matched with the second image of the second marker stored in the memory among the image captured by the camera; and applying a first stimulus to the animal by the stimulus applicator when the image matched with the image of the marker is recognized in the image captured by the camera or a second stimulus to the animal by the stimulus applicator when the image matched with the second image of the second marker is recognized in the image captured by the camera, the second stimulus being different than the first stimulus, wherein applying at least one of said first stimulus and said second stimulus occurs without said control unit receiving a signal from a unit which is separate from said apparatus.

14. The method according to claim 13, wherein the preset shape of the marker is different than the second preset shape of the second marker.

15. The method according to claim 14, wherein the stimulus applicator is capable of applying at least two different types of stimuli to the animal, and applying the stimulus comprises applying different types of stimuli to the animal based on a type of the recognized marker.

16. The method according to claim 14, wherein the strength of the stimulus applied to the animal by the stimulus applicator is adjustable, and applying the stimulus comprises applying stimuli of different strengths to the animal based on a type of the recognized marker.

17. The method according to claim 13, wherein the stimulus applied to the animal includes at least one of a sound, a vibration, and an electric shock stimulus.

18. The method according to claim 13, wherein the marker is coated with a fluorescent material, a phosphorescent material, or a light reflective material on at least the surface thereof.

19. The method according to claim 13, wherein the marker includes a light emitting element that emits light in a predetermined color or shape, and emits light autonomously.

20. The method according to claim 19, wherein the marker further includes a light intensity sensor to sense an amount of ambient light, and enables the light emitting element to operate when an amount of light sensed by the light intensity sensor is less than or equal to a predetermined value.

21. The method according to claim 13, wherein the apparatus put on the animal further includes a light intensity sensor to sense an amount of ambient light, and a lighting device to illuminate the ground surface captured by the camera, and capturing the ground surface image comprises capturing the ground surface image while illuminating the ground surface using the lighting device when an amount of light sensed by the light intensity sensor is less than or equal to a predetermined value.

22. The method according to claim 21, wherein the apparatus put on the animal further includes a motion sensor to sense a motion of the animal, and capturing the ground surface image comprises capturing the ground surface image while illuminating the ground surface using the lighting device when an amount of light sensed by the light intensity sensor is less than or equal to a predetermined value and a motion of the animal is sensed by the motion sensor.

23. The method according to claim 13, wherein the apparatus put on the animal further includes a motion sensor to sense a motion of the animal, and the control unit operates the camera and the stimulus applicator only when a motion of the animal is sensed by the motion sensor.

24. The method according to claim 13, wherein a strength of the stimulus applied to the animal by the stimulus applicator is adjustable, and the control unit stores an operation time of the stimulus applicator in the memory each time the stimulus applicator operates, and adjusts the strength of the stimulus based on the operation time of the stimulus applicator stored in the memory.

* * * * *